July 9, 1957     D. O. BARRETT     2,798,523
BAGS AND METHOD OF MANUFACTURING SAME
Filed Oct. 18, 1954     2 Sheets-Sheet 1
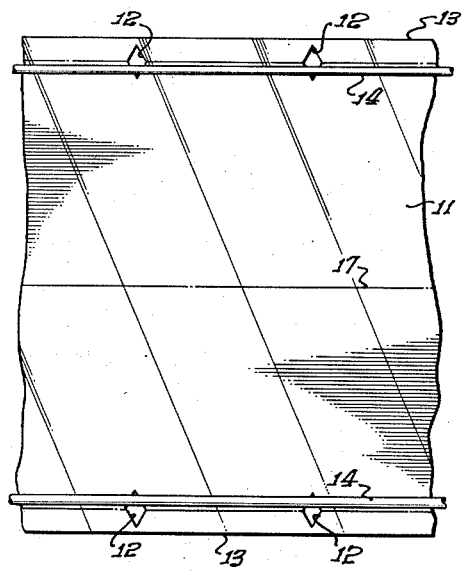
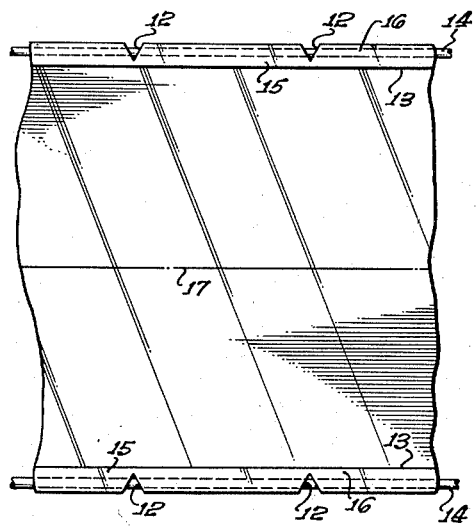
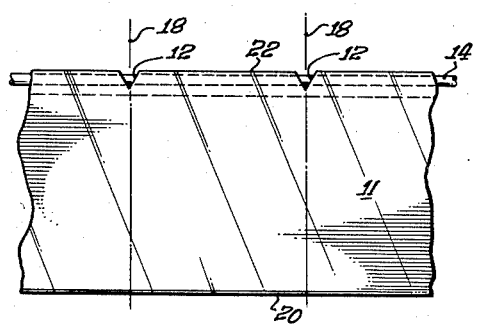
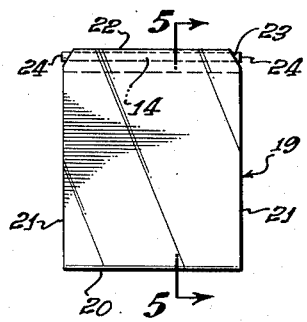
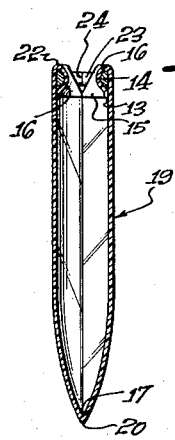
DONALD O. BARRETT,
INVENTOR.
By His Attorneys
HARRIS, KIECH, FOSTER & HARRIS.

July 9, 1957 D. O. BARRETT 2,798,523
BAGS AND METHOD OF MANUFACTURING SAME
Filed Oct. 18, 1954 2 Sheets-Sheet 2
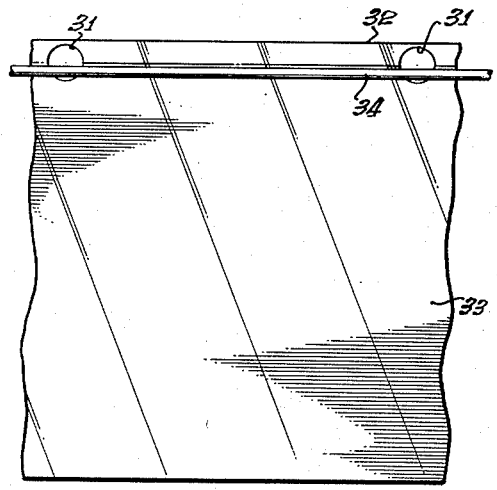
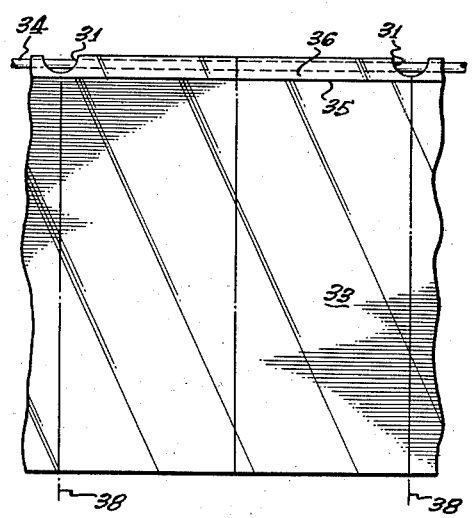
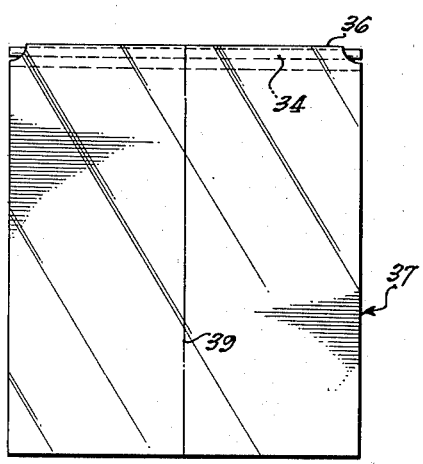
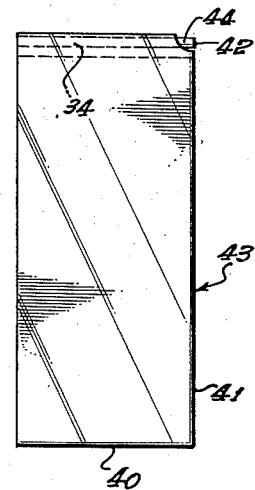
DONALD O. BARRETT,
INVENTOR.
BY HIS ATTORNEYS,
HARRIS, KIECH, FOSTER & HARRIS.

United States Patent Office 2,798,523
Patented July 9, 1957

2,798,523
BAGS AND METHOD OF MANUFACTURING SAME

Donald O. Barrett, Phoenix, Ariz.

Application October 18, 1954, Serial No. 462,747

6 Claims. (Cl. 150—11)

This invention relates to new and useful improvements in the art of packaging, and more particularly to bags having drawstrings and a method of making them from continuous strips of material.

An object of the invention is to provide a bag made of a single piece of flexible material, having a drawstring for closure, that is durable, attractive and inexpensive. Another object is to provide a bag made of plastic material having a drawstring which will not tend to cut the plastic when drawn tight.

Another object of the invention is to provide a method of rapidly and economically fabricating such a bag and one that is especially adapted to a continuous process.

A further object of the invention is to provide a method of fabricating such a bag from a heat fusible plastic material.

Still another object of the invention is to provide a bag which may have various shapes of drawstrings, such as flat, folded, round, tubular or spirally twisted.

The invention also comprises novel details of construction and arrangement of parts which will more fully appear in the course of the following description. However, the drawings merely show and the description merely describes preferred embodiments of the present invention as applied to a drawstring bag of flexible material, which is given by way of illustration or example only.

In the drawings, wherein like reference characters designate the same or similar parts in the various figures:

Fig. 1 is an illustration of an initial step in one embodiment of the invention and is a plan view of a portion of a continuous sheet of flexible material showing portions of two continuous drawstring strips in position;

Fig. 2 is a similar plan view of the continuous materials after the flap-like pocket means have been formed;

Fig. 3 is a plan view of a portion of the bag materials after folding but prior to shearing;

Fig. 4 is a side view of a completed bag;

Fig. 5 is a sectional view along the line 5—5 of Fig. 4;

Fig. 6 is an illustration of an initial step of another embodiment of the invention and is a plan view of a portion of a continuous sheet of flexible material showing a portion of a continuous drawstring strip in position;

Fig. 7 is a similar plan view of the continuous material after the flap-like pocket means have been formed;

Fig. 8 is a plan view of a single bag blank which has been sheared from the strip of Fig. 7; and Fig. 9 is a side view of another completed bag.

Referring in particular to Fig. 1, numeral 11 designates a portion of a continuous sheet of flexible material. No special type of material is essential to the practice of the invention; however, it is preferred to use a heat fusible plastic such as polyethylene rather than a fabric or a paper since it is attractive, durable and easy to manipulate.

A plurality of spaced openings 12 are made along edge portions 13 of the sheet 11, such openings being molded or punched at properly spaced positions. The openings 12 may take various shapes such as slits or round holes, and are shown in Fig. 1 as diamond shaped holes. Continuous strips of flexible string means 14 are positioned manually or mechanically in contact with the sheet 11 to extend parallel to the edge portions 13 and over the inner portions of the openings 12. The string means 14 need not be made of any particular material, but it is preferred to use a heat fusible plastic such as polyethylene. The simplest form for the string means is a flat strip which has many advantages not only as to ease of positioning but because it does not tend to cut the plastic of the bag when drawn tight. Other forms, such as a round or tubular shape or a flat strip molded double or twisted into a spiral may be utilized if desired.

The edge portions 13 are then folded over the positioned string means 14 and sealed to the sheet 11 along lines 15 which may be at or adjacent the edge portions 13, thereby producing flap-like pocket means 16, illustrated in Figs. 2 and 5. Sealing may be accomplished by various processes, such as adhesion or fusion. When the preferred heat fusible material is employed, the sealing can be done by the application of heat to the surfaces to be sealed. This can be accomplished unitarily by use of a heated edge or continuously by use of a heated wheel having a relatively sharp edge which rolls along one of the lines 15.

Then the sheet 11 is folded along center line 17 bringing the two sealed pocket means 16 into opposed relation (Fig. 3). Next the materials are sealed and severed along the lines 18. This may be accomplished by sealing or adhering the joining portions of the material in narrow zones extending to each side of each severance line 18 prior to severing. If the bags are being made of heat fusible material, the sealing and severing may be performed in one operation by using a heated knife edge or wire which simultaneously severs the materials and seals each overlying pair of severed edges.

The severing operation also severs the now-adjoining string means 14 and produces a completed bag 19 (Fig. 4) having a folded edge portion 20 and sealed edges along two unfolded edge portions 21, 21, and separate string portions in the pocket means on each side panel of the bag along another edge portion 22. The adjoining ends of such string portions are sealed or adhered together producing a ring-shaped drawstring 23, the sealed junctions of the string portions being indicated at 24. The string means may be sealed and severed at the same time that the body of the bag is sealed and severed, and when both the string means material and the bag body material are heat fusible, both severing and both sealing steps may be performed in one operation using a heated knife edge or wire.

Variations in the process of fabricating the bag may be practiced. It is preferred that the severing into individual bag elements be performed last. However, it is clear from a consideration of the process that the severing may be performed as an intermediate step and that the individual blanks may be stacked to await the next step in the process, which can be performed at a later time.

Another embodiment of the invention is illustrated in Figs. 6 through 9. Therein a plurality of spaced openings 31 are punched or otherwise formed along an edge portion 32 of a continuous sheet of flexible material 33. A continuous strip of flexible string means 34 is positioned on the sheet 33 in position overlying a side portion of each opening 31. Then the edge portions 32 are folded over the positioned string means 34 and sealed along the line 35 to form flap-like pocket means 36.

The materials of the sheet 33 and string means 34 are then severed into individual bag elements 37 along the lines 38. The individual bag element 37 is folded along the line 39 to bring portions of the flap-like pocket means into opposed relation and this folded bag element is sealed along edges 40 and 41. Similarly, the free ends of the string means are sealed at 42, thus forming a bag-like container 43 having a continuous drawstring 44. In the preferred method of practicing the invention, the edges 41 and the ends of the string means at 42 are sealed in a single operation.

Although several exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. A method of making bags from a continuous strip of flexible material, including the steps of: forming a series of spaced openings along opposite edge portions of said continuous strip to form two longitudinal series of spaced openings; positioning two continuous string means respectively along said edge portions overlying the corresponding series of spaced openings; folding said edge portions over said string means; sealing the folded-over edge portions to adjoining portions of said strip of flexible material to produce flap-like pocket means slidably confining the corresponding string means; folding said strip of flexible material along a central longitudinal fold line to bring inter-opening portions of said pocket means on opposite sides of said strip into opposed relation; sealing together the overlying portions of said folded strip by adhering same in local zones transverse to the longitudinal axis of said strip, each local zone being in alignment with a corresponding opening; severing said continuous strip of flexible material and said string means along lines within said zones to produce severed sections of said two string means respectively in opposed interopening pocket means; and sealing together a pair of adjoining ends of said severed sections of said two string means to unify same into a drawstring.

2. A method as defined in claim 1 in which said flexible material and said string means are heat sensible and said sealing is performed by the application of heat.

3. A method as defined in claim 1 in which said overlying portions and said string means are sealed simultaneously and severed simultaneously.

4. A method as defined in claim 3 in which said overlying portions and said string means are sealed and severed in one operation.

5. A method of making bags from a continuous strip of flexible material, including the steps of: forming a series of spaced openings along two opposed edge portions of said continuous strip; positioning continuous string means respectively along each of said edge portions overlying the respective series of spaced openings; folding said edge portions over said string means; sealing the folded-over edge portions to the adjacent material of said continuous strip to produce flap-like pocket means respectively slidably confining said string means; folding said strip along a central fold line to bring inter-opening portions of said pocket means into opposed relation; subsequently simultaneously severing transversely said continuous strip and said continuous string means along severance lines respectively substantially bisecting opposed openings; and sealing together adjoining cut ends of said string means to unify the string means in said opposed pocket means.

6. A method of making bag-like containers from a sheet of flexible material, including the steps of: forming a plurality of spaced openings along opposite edge portions of said sheet of flexible material; positioning string means respectively overlying the spaced openings; folding said edge portions over the respective string means; sealing said folded-over edge portions to the adjacent portion of said sheet to produce flap-like pocket means slidably confining said string means; folding said sheet to bring portions of said pocket means into opposed relation and to bring other portions of said sheet into opposed relation; and sealing together said other portions of said folded sheet.

References Cited in the file of this patent

UNITED STATES PATENTS

| | | |
|---|---|---|
| 1,818,030 | Arnold | Aug. 11, 1931 |
| 1,920,824 | West | Aug. 1, 1933 |
| 2,565,283 | Throckmorton | Aug. 21, 1951 |
| 2,656,769 | Hultkrans | Oct. 27, 1953 |
| 2,777,491 | Ashton et al. | Jan. 15, 1957 |

FOREIGN PATENTS

| | | |
|---|---|---|
| 475,548 | Canada | July 24, 1951 |